United States Patent
Qian

(12) 
(10) Patent No.: US 6,213,626 B1
(45) Date of Patent: Apr. 10, 2001

(54) CONVERTIBLE WORKLIGHT

(75) Inventor: Pei Sheng Qian, Shanghai (CN)

(73) Assignee: Regent Lighting Corporation, Burlington, NC (US)

(*) Notice: Subject to any disclaimer, the term of this patent is extended or adjusted under 35 U.S.C. 154(b) by 0 days.

(21) Appl. No.: 09/327,197

(22) Filed: Jun. 7, 1999

Related U.S. Application Data

(60) Provisional application No. 60/088,053, filed on Jun. 5, 1998.

(51) Int. Cl.$^7$ ........................................................ F21S 8/08
(52) U.S. Cl. ........................ 362/413; 362/410; 362/414; 362/418; 362/431; 369/4; 369/155; 369/428; 248/125.8
(58) Field of Search ..................................... 362/413, 414, 362/418, 403, 427, 428, 431, 410, 326, 369, 426; 396/4, 155, 428, 419; 248/151, 125.8, 125.7, 177.1

(56) References Cited

U.S. PATENT DOCUMENTS 5,205,645 * 4/1993 Lee ........................................ 362/431

* cited by examiner

*Primary Examiner*—Sandra O'Shea
*Assistant Examiner*—Bertrand Zeade
(74) *Attorney, Agent, or Firm*—Niro, Scavone, Haller & Niro

(57) ABSTRACT

A dual purpose light that may be configured as both a floor-type worklight and as an elevated stand light. The present invention provides a light stand which has a threaded post on its terminal end that is adapted to receive a light housing having a pair of pivotal support legs. When the leg are in an open position, they support the light housing on a support surface in a non-elevated position. When in a closed position, the legs are co-extensively arranged with a common aperture that accepts the thread post on the stand for affixing the light housing to the stand for use in an elevated position.

1 Claim, 2 Drawing Sheets

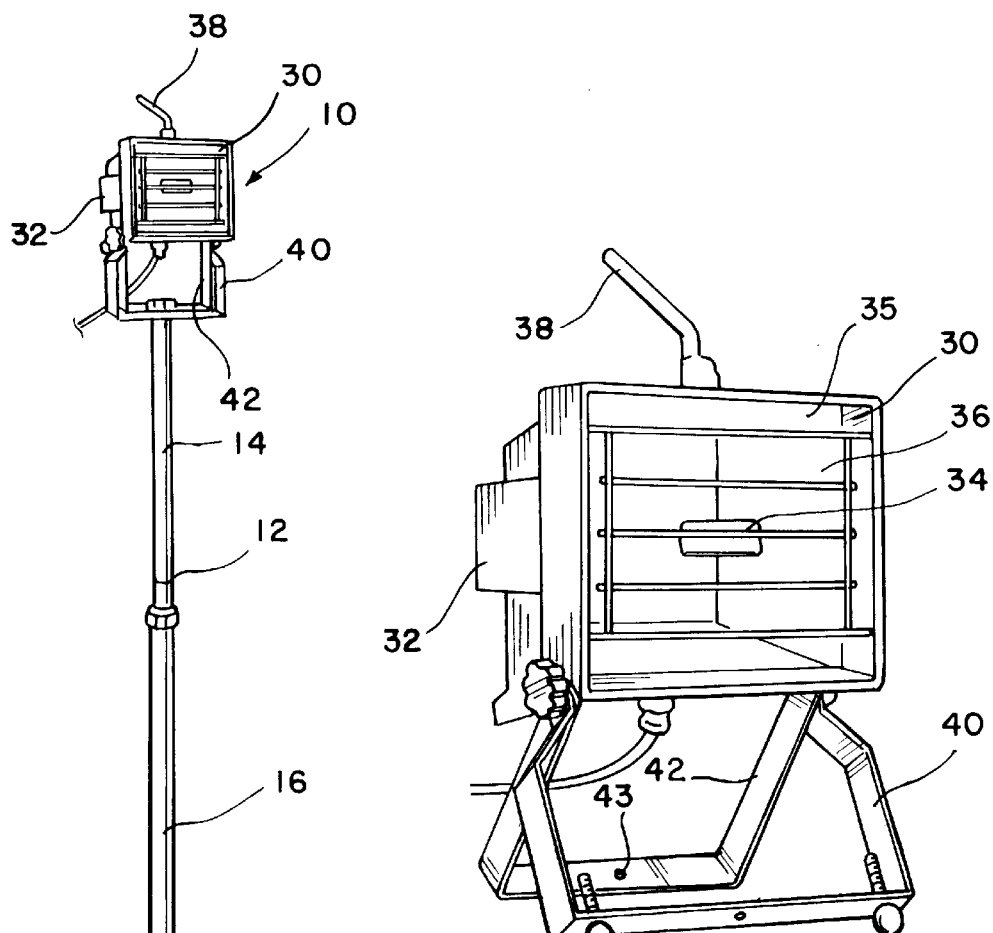
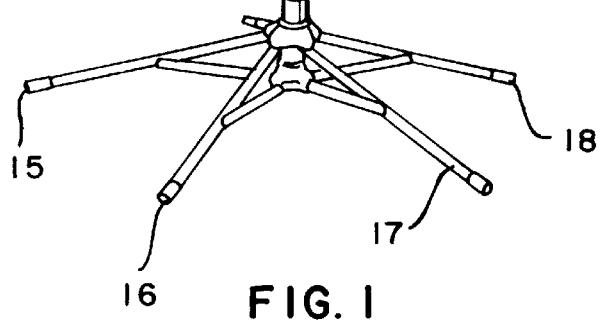

CONVERTIBLE WORKLIGHT

This application claims the benefit of Provisional Application No. 60/088,053 filed Jun. 5, 1998.

BACKGROUND OF THE INVENTION

The invention relates to worklights. More specifically, the invention relates to a worklight that may function as both a portable floor-type worklight and as a portable stand light.

SUMMARY OF THE INVENTION

Portable halogen worklights are often sold in two types of configurations. The first are floor-type models that are often supported on a small stand or legs that elevate the light housing a few inches off of the support surface. The other version are stand-type of lights. These lights use a stand to elevate the light housing several feet off of the ground. However, it would be beneficial, and more economical, to have a light that may function as both a floor-type model and as an elevated stand light.

The present invention provides a dual purpose light that may be configured for both types of uses. The present invention provides a light stand which has a threaded post on its terminal end that is adapted to receive a light housing having a pair of pivotal support legs. When the leg are in an open position, they support the light housing on a floor or support surface. When in a closed position, the legs are co-extensively arranged with a common aperture that accepts the post on the stand for affixing the light housing to the stand.

BRIEF DESCRIPTION OF THE DRAWINGS

The novel features which a characteristic of the present invention are set forth in the appended claims. However, the invention's preferred embodiments, together with further objects and attendant advantages, will be best understood by reference to the following detailed description taken in connection with the accompanying drawings in which:

FIG. 1 is a perspective view of the invention in an elevated position on a stand;

FIG. 2 is a perspective view of the invention functioning as a floor-type portable worklight;

DETAILED DESCRIPTION OF THE PREFERRED EMBODIMENTS

This application claims priority to Provisional Patent Application Ser. No. 60/088,053, filed Jun. 5, 1998.

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 5:
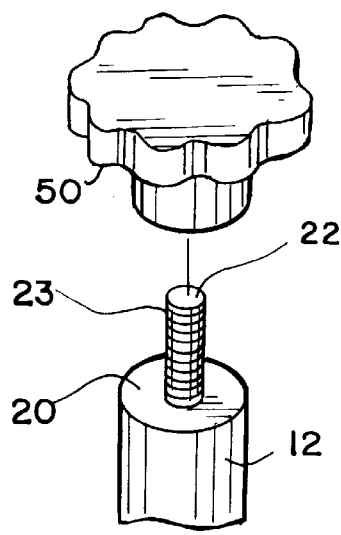
FIG. 5 shows is a partial view of the terminal end of a stand used with the invention.
Figure 6:
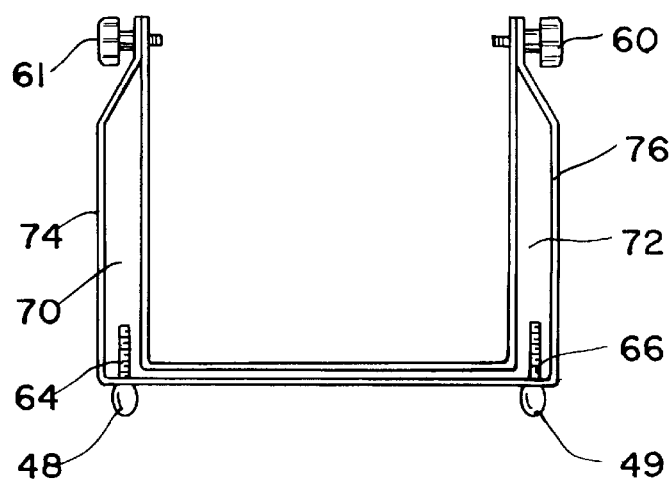
FIG. 6 is a side view of the legs in a closed position.

FIG. 1 shows one embodiment of the present invention adapted to function as a stand light. As shown, a light fixture 10 is affixed to stand 12 which is comprised of two coaxially positionable poles 14 and 16 as well as legs 15–18 which support the poles in an upright position. As shown in FIG. 5, the stand has a terminal end 20 from which post 22 extends.

Also included is a light housing 30 which may be comprised of a design typically used with halogen light sources. It may include housing 32, light source 34, lens 35, reflector 36, grill 37, and handle 38.

Figure 4:
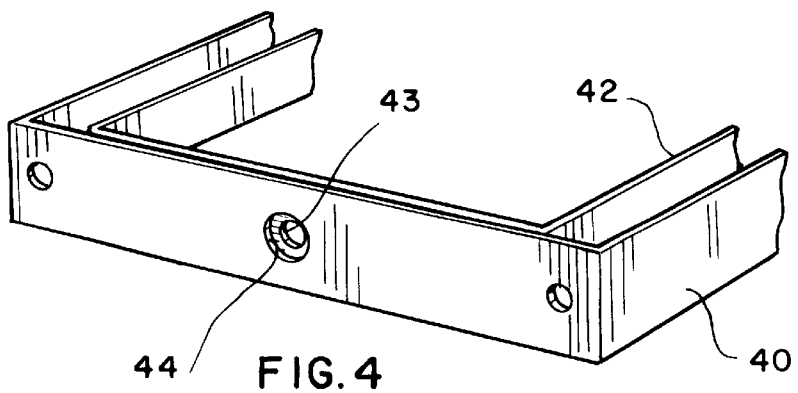
FIG. 4 is a perspective view of the pivotal legs in a closed position.

A pair of legs 40 and 42 are pivotally connected to light housing 32 by fasteners 60 and 61. The legs include apertures 43 and 44 which are positioned to co-extensively align together as shown in FIG. 4 when the legs are in a closed position. Also included on leg 40 are padded stops 48 and 49 which are adjustable in length by use of threaded portions 64 and 66 which extend into apertures 70 and 72 formed by bowed or extended portions 74 and 76 on leg 40.

Figure 3:
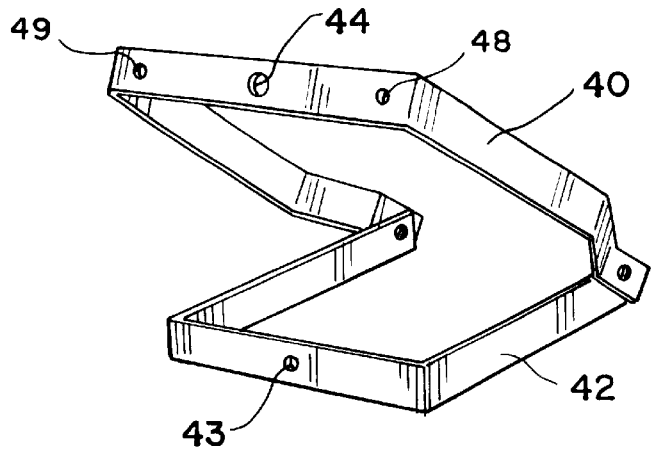
FIG. 3 is a perspective view of the pivotal legs in an open position.

In use, when a floor-type worklight is desired, legs 40 and 42 are placed into an open position which results in the legs being opposingly located as shown in FIGS. 2 and 3. This allows the legs to support the light in an upright position for use. In addition, padded stops or rests 48–49, which may be made of rubber or some other similar material, assist in preventing unwanted sliding of the light. In addition, because the rests are adjustable in length, they also aid in the angular positioning of the light.

When an elevated stand light is desired, the legs are pivoted into a closed position to form a unitary base by nesting the legs together. As shown in FIG. 4, in this position legs 42 and 44 may be coextensively arranged and apertures 43–44 are axially aligned to permit the insertion of extension or post 22 through one or both of the apertures. This permits the light fixture to be rotated about the post for the positioning of the light fixture. The post may include a threaded element 23 which coacts with fastener 50 to releasably secure the light to the stand.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A portable halogen worklight comprising:

a support stand and a light housing having a light source;

a pair of legs rotatably affixed to said light housing, said legs adapted to operate between open and closed positions;

an aperture located on each of said legs, said apertures positioned on said legs to be coextensively aligned when said legs are in a closed position;

a threaded post located on a terminal end of said stand, said post adapted to be insertable through said apertures when said legs are in a closed position to securingly retain said light fixture on said stand;

in an open position, said legs are adapted to support said light housing on a support surface; and at least one of said legs includes outwardly extended portions defining apertures in which threaded elements of a plurality of rests depend, said threaded elements adapted to adjustably change the length of said rests.

* * * * *